Figure 1:
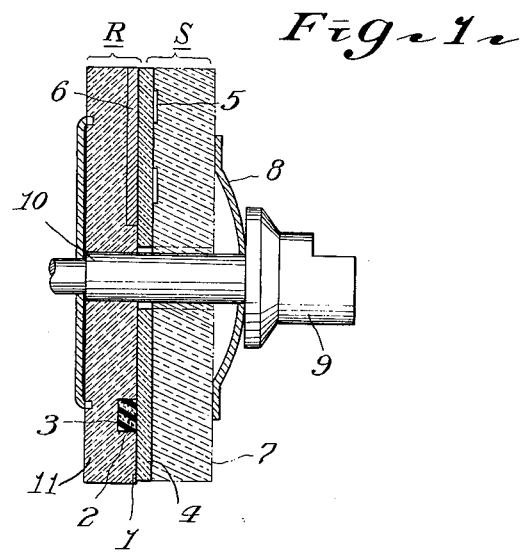

United States Patent Office 3,202,889
Patented Aug. 24, 1965

3,202,889
VARIABLE CAPACITOR
Daijiro Matsui, Ota-ku, Tokyo-to, Japan, assignor to Kabushiki Kaisha Toko Radio Coil Kenkyusho, Ota-ku, Tokyo-to, Japan, a joint-stock company of Japan
Filed Mar. 13, 1962, Ser. No. 179,308
Claims priority, application Japan, Mar. 15, 1961, 36/12,891
3 Claims. (Cl. 317—249)

This invention relates to electrical capacitors of variable capacitance. More particularly, it relates to a new construction of a variable capacitor of the type wherein a piece of dielectric material, such as ceramic, has mutually parallel, flat surfaces, one surface having printed thereon an electrode, and the other surface serving as a sliding surface, and an opposite electrode is disposed rotatably, with compressive pressure, against the said sliding surface so that, by rotating the said opposite electrode, the overlappingly exposed surface area between the two electrodes is varied. This mechanism, simply stated, is that of a rotor in sliding rotation relative to a stator as it is maintained in compressive contact therewith.

Variable capacitors of this type known heretofore have had the disadvantage of considerably high torque necessary to rotate the rotor because of the pressure used in pressing the rotor against the stator.

It is an object of the present invention to provide a variable capacitor of the above-stated type in which the torque necessary to rotate the rotor is substantially low.

It is another object of the invention to provide a variable capacitor of the above description which has smooth rotational action which is not distributed by the infiltration of grit and other foreign substances into the space between the sliding surfaces.

Said objects and other objects of this invention have been attained by an improved construction which comprises at least one groove provided in the sliding surface between said stator and rotor and a lubricant agent placed in said groove.

Figure 2:
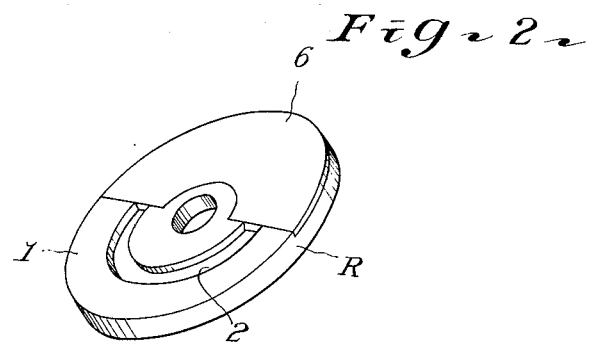

The nature of the invention, its details, and the manner in which the foregoing objects may best be achieved will be more clearly apparent by reference to the following description of one representative embodiment of the invention when taken in conjunction with the accompanying drawing in which the same parts are designated by the same reference numeral or letter, and in which:

FIG. 1 is a side view, partly in vertical section taken along a plane through the central axis, showing one embodiment of the present invention in assembled state; and FIG. 2 is a perspective view showing the rotor of the embodiment of FIG. 1.

Referring to the drawing, the variable capacitor shown comprises a stator S composed of a dielectric member 4 having electrodes 5 printed on one surface thereof and dielectric means 7 for supporting the dielectric member 4, a rotor R comprising a dielectric plate 11 having a sliding surface 1, an electrode 6, a rotating shaft 10 attached thereto and having a control knob 9 for achieving the control action described hereinbefore, and a spring 8 inserted between the stator S and knob 9.

It is an important feature of the instant variable capacitor that the sliding surface 1 of the rotor R has a groove 2 of suitable configuration formed therein, into which a lubricant, such as oil, or a sponge-like material 3 impregnated with a lubricant is placed.

While the construction described above is that of the case wherein the dielectric member 4 and its support means 7 is made the stator, it will be obvious that the combination of these parts may be, conversely, made the rotor.

Since, by the above-described construction, a groove 2 is provided in the sliding surface 1, into which a lubricant or a non-conductive sponge-like material 3 impregnated with a lubricant is placed, the lubricant is caused by capillary effect to penetrate into the space between the sliding surfaces, wherefore the rotation of the rotor is extremely smooth, and capacitance adjustment can be accomplished easily with low torque. Moreover, should grit or other foreign substances infiltrate into the space between the sliding surfaces, they are promptly absorbed within the groove 2.

Although the invention has been described with respect to a few particular embodiments thereof, it is not to be so limited as changes and modifications may be made therein which are within the full intended scope of the invention as defined by the appended claims.

I claim:
1. In a variable capacitor of the type consisting of a stator and a rotor, one of which is essentially a flat piece of dielectric material with one surface having an electrode printed thereon and the other surface serving as a sliding surface, and the other of which is an opposite electrode disposed rotatably, with compressive contact pressure, against the said sliding surface, at least one semi-annular groove, narrow with respect to said one surface, in the sliding surface of at least one of said stator and rotor, an electrically non-conductive liquid lubricant placed in said groove, and means for retaining said lubricant in said groove.

2. A variable capacitor according to claim 1, wherein the lubricant in the groove is oil.

3. A variable capacitor according to claim 1, wherein the means for retaining said lubricant in the groove is a non-conductive sponge-like material impregnated with said lubricant.

References Cited by the Examiner
UNITED STATES PATENTS 2,217,383 10/40 Robinson _____ 317—249
2,535,367 12/50 Minnium _____ 317—249

JOHN F. BURNS, *Primary Examiner.*
JOHN P. WILDMAN, *Examiner.*